ANIMATION DEVICE

Original Filed Feb. 5, 1962

INVENTOR.
RONALD D. ALLEMAN
BY
George F. Westerman
ATTORNEY 3,197,901
ANIMATION DEVICE
Ronald D. Alleman, 561st Eng. Co. (Port Construction), Fort Baker, Calif.
Original application Feb. 5, 1962, Ser. No. 171,321. Divided and this application June 9, 1964, Ser. No. 382,678
2 Claims. (Cl. 40—78)
(Granted under Title 35, U.S. Code (1952), sec. 266)

The invention described herein may be manufactured and used by or for the Government for governmental purposes without the payment of any royalty thereon.

This application is a division of Serial No. 171,321, filed February 5, 1962, now Patent No. 3,144,726.

The present invention relates to a mechanism for producing an illusion of motion from a succession or series of picture-bearing cards, film or the like, by manipulation thereof in such a manner that successive cards or film of a series thereof may be removed from one portion of a stack or supply thereof and deposited at another position within such stack or supply in a manner so that, after viewing, each card will come to assume its original serial position as the stack or supply thereof becomes exhausted by such manipulative operations. These operations can be carried out at such speed that there appears to the eye of a viewer an illusion of continuous or uninterrupted motion between the pictures or images on successive cards or at a slower speed enabling reading or close viewing of individual cards. Viewing of the individual cards successively is accomplished as each is held stationary momentarily at one point in the above cycle.

Accordingly, an object of the present invention is to provide a mechanism of the above-indicated character which is useful as a training aid in connection with military training, but which is also adaptable to a wide diversity of applications.

A second object of this invention is to provide for an inexpensive viewer of opaque film frames, which is manually operated, and compact and simple in construction and operation, which is readily adapted to motor driven operation and a multitude of uses involving the manipulation of various types of intelligence bearing or intelligence receptive sheets.

The structural features of an embodiment of the invention are illustrated in the accompanying drawings, in which.

It will be understood that the term "cards" as used throughout the present description is intended to include in addition to flexible opaque image bearing cards, transparent and translucent image bearing photographic film which is to be manipulated in like manner to opaque cards in the construction illustrated in the accompanying drawings.

Figures 2, 3, 4:
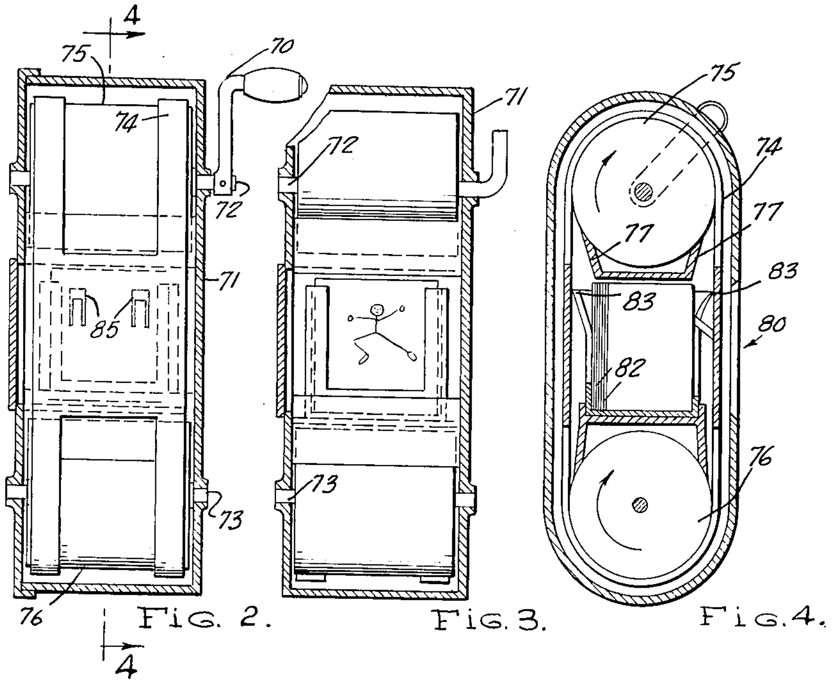
FIG. 2 is a sectional view of the casing of FIG. 1, the remainder of the structure being shown in elevation.
FIG. 3 is a view generally similar to FIG. 2, the belt for manipulating the cards to be viewed being shown in section, the remainder of the structure being shown in elevation with the card supply being shown as vertically disposed in the holder or magazine therefor.
FIG. 4 is a vertical sectional view taken on the line 4—4 of FIG. 2.
Figure 1:
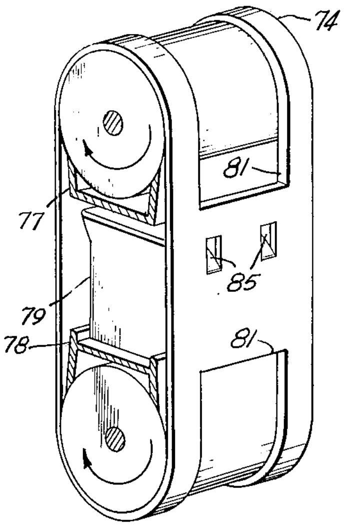
FIG. 1 is a perspective view of the construction, the view being shown partly in section.
Figure 5:
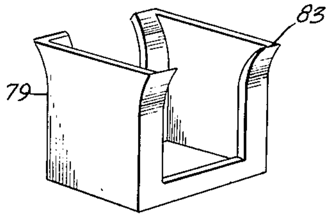
FIG. 5 is a perspective view of the card holder or magazine used in FIG. 1.

FIGS. 1–5 show an embodiment employing a belt 74 turning on rollers 75 and 76 to pick up and transfer cards in succession. Rollers 75 and 76 are mounted on axles 72 and 73 respectively and turn within case 71. Movement for the rollers and the endless belt is provided by hand turning crank 70. Mounted between the rollers and within the endless belt is removable magazine 79 having an open front and an open rear. The opaque motion picture cards 82 are placed vertically within the magazine 79, which is inserted in channel member 78 to load the device. With the device loaded, when the crank is turned. endless belt 74 turns in a direction which, as shown in FIG. 1 would be clockwise, until tabs 85, penetrating the rear openings of magazine 79, contact the outermost card 82. As the card is contacted the tabs cause it to move upward past guide 77 and between endless belt 74 and roller 75. The card passes around the roller and is again deposited in magazine 79, having been directed therein by flanges 83. As the card enters the front portion of magazine 79, it is viewed through the veiwing aperture 80 and frames 81 in belt 74. Rapid succession of cards falling into the magazine produce the illusion of motion to the observer.

I claim:

1. A device for viewing in succession a series of indicia bearing cards comprising a removable open top card-holding magazine for stacks of indicia bearing cards, said magazine having a slotted exit side and a slotted entry side, said entry side being flared outwardly to receive incoming cards; individual successive card withdrawal means at said exit side of said magazine and card conveyor means between said exit side of said magazine and said entry side of the same magazine; an enclosing case enclosing said conveyor means and said magazine; and at least one viewing aperture in said case so disposed as to allow views of successive cards.

2. A device for viewing in succession a series of indicia bearing cards comprising a removable open top card-holding magazine for a stack of indicia bearing cards, said magazine having a slotted exit side and a slotted entry side; individual successive card withdrawal means at said exit side of said magazine and card conveyor means between said exit side of said magazine and said re-entry side of said magazine including a roller suspended endless turning belt having a plurality of card shaped windows along its length and turning about said magazine a plurality of card contact tabs so disposed as to contact the outermost card at said exit side as said belt passes, said belt, tabs, and rollers so located as to move each card in succession between one of said rollers and said belt to convey said card to said re-entry side and to permit viewing of each card through the belt window before it is removed from the exit side of said magazine, and turning means for said rollers; an enclosing case enclosing said belt, said magazine and said rollers, and mounting said rollers; and a viewing aperture in said case so disposed as to allow a view of successive cards.

References Cited by the Examiner

UNITED STATES PATENTS 1,716,582 6/29 Gifford ---------------- 40—78
2,812,056 11/57 Jenkins -------------- 40—78 X

FOREIGN PATENTS 1,038,908 9/58 Germany.

EUGENE R. CAPOZIO, *Primary Examiner.*
JEROME SCHNALL, *Examiner.*